US012067936B2

(12) United States Patent
Takatori

(10) Patent No.: US 12,067,936 B2
(45) Date of Patent: Aug. 20, 2024

(54) PIXEL CIRCUIT AND PIXEL CONTROL METHOD

(71) Applicant: Huawei Technologies Co., Ltd., Shenzhen (CN)

(72) Inventor: Kenichi Takatori, Tokyo (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 17/538,571

(22) Filed: Nov. 30, 2021

(65) Prior Publication Data

US 2022/0084466 A1 Mar. 17, 2022

Related U.S. Application Data

(63) Continuation of application No. PCT/CN2019/089595, filed on May 31, 2019.

(51) Int. Cl.
*G09G 3/3233* (2016.01)

(52) U.S. Cl.
CPC ....... *G09G 3/3233* (2013.01); *G09G 2310/08* (2013.01); *G09G 2330/021* (2013.01); *G09G 2360/144* (2013.01)

(58) Field of Classification Search
CPC ........... G09G 3/3233; G09G 2320/045; G09G 2310/0251; G09G 2310/061; G09G 2360/142; G09G 3/3258; G09G 2360/14
See application file for complete search history.

(56) References Cited

U.S. PATENT DOCUMENTS

| | | | |
|---|---|---|---|
| 7,760,164 B2 | 7/2010 | Shin |
| 9,536,472 B2 | 1/2017 | Park et al. |
| 10,074,710 B2 | 9/2018 | Ebisuno et al. |
| 10,204,975 B2 | 2/2019 | Kang |

(Continued)

FOREIGN PATENT DOCUMENTS

| | | | |
|---|---|---|---|
| CN | 1411609 A | 4/2003 |
| CN | 101471034 A | 7/2009 |

(Continued)

OTHER PUBLICATIONS

Zhou et al., "39-2: Highly Sensitive a-Si:H PIN Photodiode Gated LTPS TFT for Optical In-Display Fingerprint Identification," SID Symposium Digest of Technical Papers, vol. 49, pp. 490-493, SID 2018 Digest (2018).

*Primary Examiner* — Dennis P Joseph
(74) *Attorney, Agent, or Firm* — Leydig, Voit & Mayer, Ltd.

(57) ABSTRACT

Provided are a pixel circuit and a pixel control method capable of quickly controlling pixels with a simpler configuration of a combination of a photosensor and a pixel circuit. The pixel circuit includes: a switching transistor for switching a data signal to be applied to a data line; a driving transistor for supplying a drive current to an organic light emitting diode (OLED) according to a charge voltage corresponding to the data signal; a compensation transistor for compensating for a threshold voltage of the driving transistor; and a photosensor having a terminal to which a bias voltage is applied, wherein the switching transistor is a dual gate transistor having a first gate connected to another terminal of the photosensor, and a second gate connected to a gate of the compensation transistor.

7 Claims, 17 Drawing Sheets

(56) References Cited

U.S. PATENT DOCUMENTS

| | | | | |
|---|---|---|---|---|
| 2005/0017934 | A1 | 1/2005 | Chung et al. | |
| 2005/0030264 | A1 | 2/2005 | Tsuge et al. | |
| 2009/0128534 | A1 | 5/2009 | Fish et al. | |
| 2014/0354622 | A1 | 12/2014 | Qin et al. | |
| 2015/0103037 | A1* | 4/2015 | Wu | G06F 3/0412 345/80 |
| 2016/0217735 | A1 | 7/2016 | Park et al. | |
| 2017/0032728 | A1* | 2/2017 | Shima | G06F 3/0412 |
| 2017/0365214 | A1 | 12/2017 | Tsai et al. | |
| 2018/0069069 | A1 | 3/2018 | Ebisuno et al. | |
| 2019/0207627 | A1 | 7/2019 | Minner | |

FOREIGN PATENT DOCUMENTS

| | | | |
|---|---|---|---|
| CN | 103295525 | A | 9/2013 |
| CN | 103354079 | A | 10/2013 |
| CN | 103762251 | A | 4/2014 |
| CN | 104573648 | A | 4/2015 |
| CN | 205262967 | U | 5/2016 |
| CN | 105870174 | A | 8/2016 |
| CN | 106295540 | A | 1/2017 |
| CN | 106546743 | A | 3/2017 |
| CN | 106782272 | A | 5/2017 |
| CN | 107255710 | A | 10/2017 |
| CN | 107301844 | A | 10/2017 |
| CN | 107358916 | A | 11/2017 |
| CN | 108735782 | A | 11/2018 |
| EP | 1840971 | A1 | 10/2007 |
| WO | 2018023424 | A1 | 2/2018 |

* cited by examiner (a)

(b)

| OLED | INITIALIZING | PROGRAMMING | EMITTING | | DARK |
|---|---|---|---|---|---|
| PD | Sens | | | READOUT | Sens (/READOUT) |
| Gate(n-1) | ON | OFF | OFF | OFF | OFF |
| Gate(n) | OFF | ON | OFF | Vbias | OFF |
| Em | OFF | OFF | ON | ON | OFF |
| N1 | Vinit | Vdata-Vth | Vdata-Vth | Vdata-Vth | Vdata-Vth |
| N2 | | Vdata | Vdd | Vdd | Vdd |

FIG.9

PIXEL CIRCUIT AND PIXEL CONTROL METHOD

CROSS-REFERENCE TO RELATED APPLICATIONS

This application is a continuation of International Application No. PCT/CN2019/089595, filed on May 31, 2019, the disclosure of which is hereby incorporated by reference in its entirety.

TECHNICAL FIELD

The present disclosure relates to a pixel circuit and a pixel control method therefor, and, more particularly, to a pixel circuit which is applied to an organic electroluminescent (EL) display and is combined with a photosensor, and a control method for a pixel circuit.

BACKGROUND ART

A conventionally known organic electroluminescent (EL) display is a flat panel display that uses an organic light emitting diode (OLED) as a display element and drives the OLED by current to emit light.

Generally, in the pixel circuit of an organic EL display, a driving transistor causes the current to flow to the OLED, so that the characteristics of the driving transistor are important. A thin film transistor (TFT) used as a driving transistor has a problem such that the threshold voltage is not uniform, and even if same data is input, different currents are generated to cause variations in luminance. Therefore, various pixel unit drive circuits are designed to compensate for variations in threshold voltage of individual TFTs. At present, a 6T1C (six transistors and one capacitor) circuit and a 7T1C (seven transistors and one capacitor) circuit are provided for each pixel as pixel unit drive circuits used for OLEDs of portable terminals. Thus, a large number of transistors implemented for one pixel are one factor to complicate the pixel circuit.

Further, a plurality of transistors are also used in an image sensor such as a CMOS sensor mounted on a portable terminal, which converts light into an electric signal. A CMOS image sensor includes an active pixel sensor (APS) that increases the gain of signals on a pixel-by-pixel basis to increase the signal-to-noise ratio (S/N ratio) of the photosensor. The structure of the APS includes, for each pixel, three TFTs: a transistor for resetting the voltage of a photodiode (PD), a transistor for amplifying the gain, and a transistor for reading out the signal.

In a case of forming an organic EL display including a pixel circuit combined with a photosensor, one APS is combined with a single pixel of an OLED. Since a pixel circuit is configured by implementing a pixel unit drive circuit such as a 6T1C circuit or a 7T1C circuit together with an APS structure having a photosensor. Therefore, the circuit configuration becomes more complicated, thus requiring a larger footprint. This results in a reduction in the resolution of the display. In addition, when the pixel unit drive circuit of the OLED and the APS structure having the PD individually occupy resources, it takes time to control the pixels.

SUMMARY

It is an objective of the present disclosure to provide a pixel unit drive circuit, which has a simple circuit structure, and could be used to reduce complexity of a pixel circuit that includes this pixel unit drive circuit. Further, in the present invention, a pixel control method capable of quickly controlling sub pixels with photosensors is provided.

According to a first aspect, there is provided a pixel circuit having: a switching transistor for switching a data signal to be applied to a data line; a driving transistor for supplying a drive current to an organic light emitting diode (OLED) according to a charge voltage corresponding to the data signal; a compensation transistor for compensating for a threshold voltage of the driving transistor, the pixel circuit including a photosensor having a terminal to which a bias voltage is applied, wherein the switching transistor is a dual gate transistor having a first gate connected to another terminal of the photosensor, and a second gate connected to a gate of the compensation transistor.

The first aspect allows a photosensor having a desired sensitivity to be implemented into a pixel circuit without reducing the implementation efficiency.

According to a possible implementation of the first aspect, a scan signal for turning on the dual gate transistor is applied to the second gate to charge the data signal applied to the data line, and an adaptively controlled scan signal is applied to the second gate to read out a signal from the photosensor from the data line.

According to this implementation, the dual gate transistor operates as a readout transistor for reading out a signal from the photosensor as well as an amplification transistor for amplifying a signal, and can ensure fast signal reading from a photosensor in a combination of the OLED and the photosensor.

According to a possible implementation of the first aspect, the adaptively controlled scan signal is a voltage of a level between a high level and a low level, thereby a voltage of the second gate is varied according to charges stored by the photosensor, and a current according to a voltage applied to the first gate flows through the data line.

According to a possible implementation of the first aspect, the adaptively controlled scan signal is controlled according to an intensity of environmental light.

According to this implementation, the photosensor can be operated as a highly sensitive photosensor which is not affected by ambient environmental light.

According to a second aspect, there is provided a pixel control method for a pixel circuit of the first aspect, the method includes:

- causing the dual gate transistor to operate as a switch for switching the data signal; and
- causing the dual gate transistor to operate as an amplifier of the photosensor to read out a signal from the photosensor from the data line.

The second aspect allows a photosensor to be implemented into a pixel circuit without reducing the implementation efficiency and also ensures that a desired sensitivity is obtained from the photosensor.

According to a possible implementation of the second aspect, the causing the dual gate transistor to operate as a switch for switching the data signal applies a scan signal for turning on the dual gate transistor to the second gate to charge the data signal applied to the data line.

According to a possible implementation of the second aspect, the reading out a signal from the photosensor from the data line applies a voltage of a level between a high level and a low level to the second gate, thereby a voltage of the second gate is varied according to charges stored by the photosensor, and a current according to a voltage applied to the first gate flows through the data line.

According to this implementation, the dual gate transistor operates as a readout transistor for reading out a signal from the photosensor as well as an amplification transistor for amplifying a signal, and can ensure fast signal reading from a photosensor in a combination of the OLED and the photosensor.

According to a possible implementation of the second aspect, the reading out a signal from the photosensor from the data line applies a scan signal adaptively controlled according to an intensity of environmental light to the second gate.

According to this implementation, the photosensor can be operated as a highly sensitive photosensor which is not affected by ambient environmental light.

According to a third aspect, there is provided a display device including a plurality of pixel units and a cover plate, the plurality of pixel units are all on the same side of the cover plate, wherein each pixel unit includes the above-mentioned pixel circuit.

BRIEF DESCRIPTION OF DRAWINGS

FIG. 9 is a diagram showing voltages at individual nodes in the operation of the pixel unit drive circuit;

DESCRIPTION OF EMBODIMENTS (Pixel Unit Drive Circuit)

First, the operational principle of the present embodiment will be described with reference to FIGS. 1 to 4.

Figure 1:
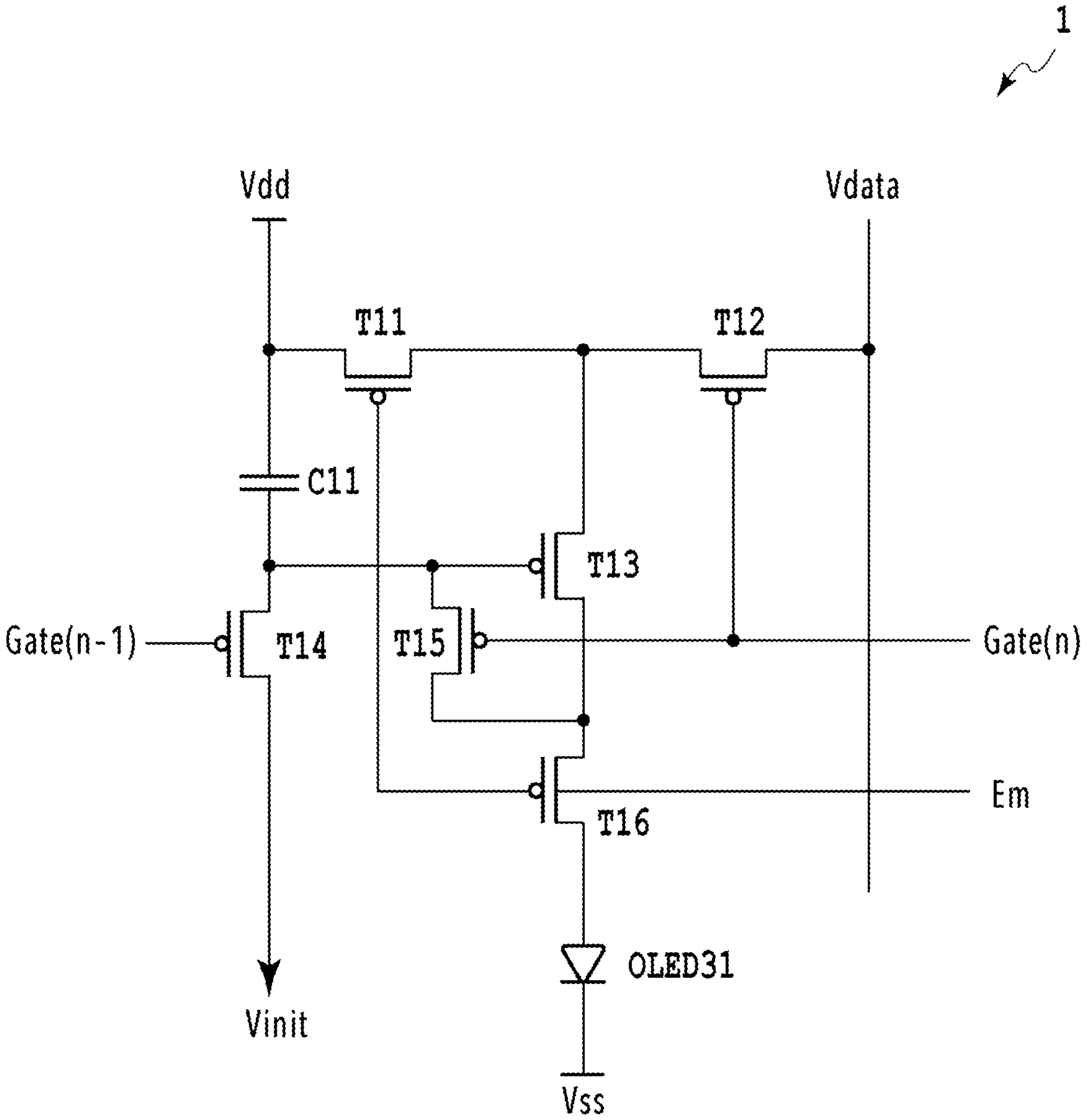
FIG. 1 is a diagram showing an example of the configuration of a 6T1C circuit which is a pixel unit drive circuit used in an OLED.

FIG. 1 is a diagram showing an example of the configuration of a 6T1C circuit which is a pixel unit drive circuit used in an OLED. This pixel unit drive circuit 1 drives and controls pixels for each pixel unit; one subpixel corresponds to a pixel unit in the following description. This pixel unit drive circuit 1 includes one OLED 31, six transistors T11 to T16, and one capacitor C11. One OLED 31 corresponds to a subpixel of one color in red (R), green (G) and blue (B) subpixels constituting one pixel.

The pixel unit drive circuit 1 includes the switching transistor T12 for, in response to a scan (gate) signal Gate(n) applied to an nth scan line, switching a data signal of a voltage level $V_{data}$ applied to the corresponding data line. The pixel unit drive circuit 1 also includes the driving transistor T13 that supplies a drive current for the OLED 31 according to a charge voltage corresponding to a data signal input to the driving transistor T13 via the switching transistor T12, and the compensation transistor T15 for compensating for a threshold voltage of the driving transistor T13. The pixel unit drive circuit 1 further includes the capacitor C11 for storing the data signal applied to the gate of the driving transistor T13, and the OLED 31 that emits light corresponding to the applied drive current.

Further, the pixel unit drive circuit 1 includes the switching transistor T11 for supplying a power supply voltage $V_{dd}$ to the driving transistor T13 in response to an emission signal Em, and the switching transistor T16 for supplying the drive current input via the driving transistor T13 to the OLED 31 in response to the emission signal Em. The transistors T11 to T16 are configured as a p-type thin film transistor (TFT).

The switching transistor T12 has a gate to which the nth scan signal Gate(n) applied to the corresponding scan line is applied, a source to which a data signal of a voltage level $V_{data}$ applied to the corresponding data line is applied, and a drain connected to a source of the driving transistor T13.

The driving transistor T13 has a gate connected to one terminal of the capacitor C11, and a drain connected to an anode terminal of the OLED 31 via the switching transistor T16. The compensation transistor T15 has a drain connected to the gate of the driving transistor T13, a source connected to the drain of the driving transistor T13, and a gate to which the scan signal Gate(n) is applied. The power supply voltage $V_{dd}$ of a high level is supplied from the corresponding power supply to the other terminal of the capacitor C11.

The switching transistor T11 has a gate to which the emission signal Em is applied, a source to which the power supply voltage $V_{dd}$ is applied through the corresponding power supply voltage line, and a drain connected to the source of the driving transistor T13. The switching transistor T16 has a gate to which the emission signal Em is applied, a source connected to the drain of the driving transistor T13, and a drain connected to the anode terminal of the OLED 31. The OLED 31 has a cathode terminal connected to a power supply of a voltage $V_{ss}$.

Further, the pixel unit drive circuit 1 includes the reset transistor T14 for initializing a data signal stored in the capacitor C11 in response to a scan signal Gate(n−1) applied to an (n−1)th scan line immediately before the nth scan line. The reset transistor T14 has a gate to which the scan signal Gate(n−1) is applied, a source connected to one terminal of the capacitor C11, and a drain to which an initialization voltage $V_{init}$ is applied.

Figure 2:
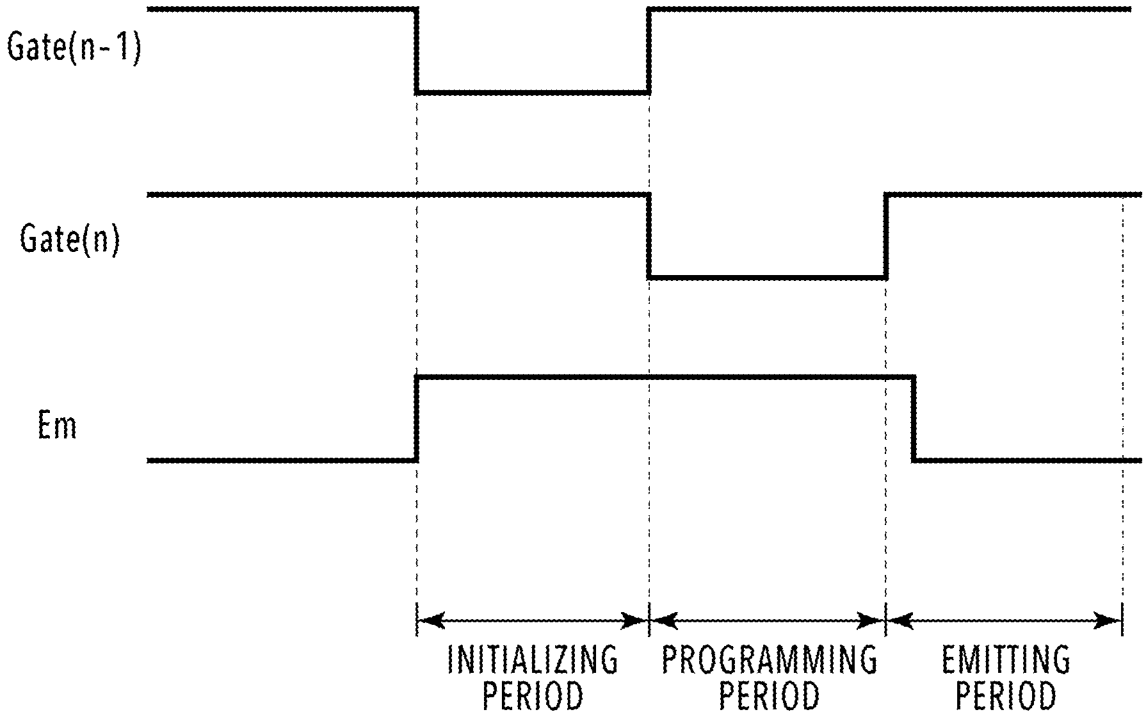
FIG. 2 is a timing chart for the operation of the pixel unit drive circuit.

FIG. 2 is a timing chart in the operation of the pixel unit drive circuit 1 shown in FIG. 1. In an initialization period, the (n−1)th scan signal Gate(n−1) is at a low level, and the nth scan signal Gate(n) and the emission signal Em are at a high level. The low-level scan signal Gate(n−1) turns the reset transistor T14 on, and the high-level scan signal Gate(n) and emission signal Em turn the other transistors T11 to T13, T15, and T16 off. Therefore, the data signal stored in the capacitor C11 is initialized, thus initializing the gate voltage of the driving transistor T13.

Next, in a precharge period, the scan signal Gate(n−1) is at a high level, the scan signal Gate(n) is at a low level, and the emission signal Em is at a high level. The reset transistor T14 is turned off, the low-level scan signal Gate(n) turns the compensation transistor T15 and the switching transistor T12 on, and the emission signal Em turns the switching transistors T11 and T16 off. Therefore, the data signal of the voltage level $V_{data}$ applied to the corresponding data line is applied to the source of the driving transistor T13, and the gate voltage of the driving transistor T13 is stabilized to $V_{data}+V_{th}$, ($V_{th}$ being the threshold voltage of the driving transistor T13) via the compensation transistor T15, and the stabilized voltage is stored in the capacitor C11, which completes a precharge operation.

In an emission period, the scan signal Gate(n−1) is at a high level, and the emission signal Em goes low after the scan signal Gate(n) goes high. The low-level emission signal Em turns the switching transistors T11 and T16 on, the high-level scan signal Gate(n−1) turns the reset transistor T14 off, and the high-level scan signal Gate(n) turns the compensation transistor T15 and the switching transistor T12 off. As a result, $V_{dd}$ is applied to the source of the driving transistor T13, and a gate-source voltage $V_{gs}$ of the driving transistor T13 becomes $$V_{gs}=V_{data}+V_{th}-V_{dd},$$

and a current I flowing through the OLED 31 is given by $$\begin{aligned}I&=k\cdot(V_{gs}-V_{th})^2\\&=k\cdot(V_{data}+V_{th}-V_{dd}-V_{th})^2\\&=k\cdot(V_{data}-V_{dd})^2\end{aligned}$$

so that a current which does not depend on the threshold voltage flows through the OLED 31, causing the OLED 31 to emit light.

Figure 3:
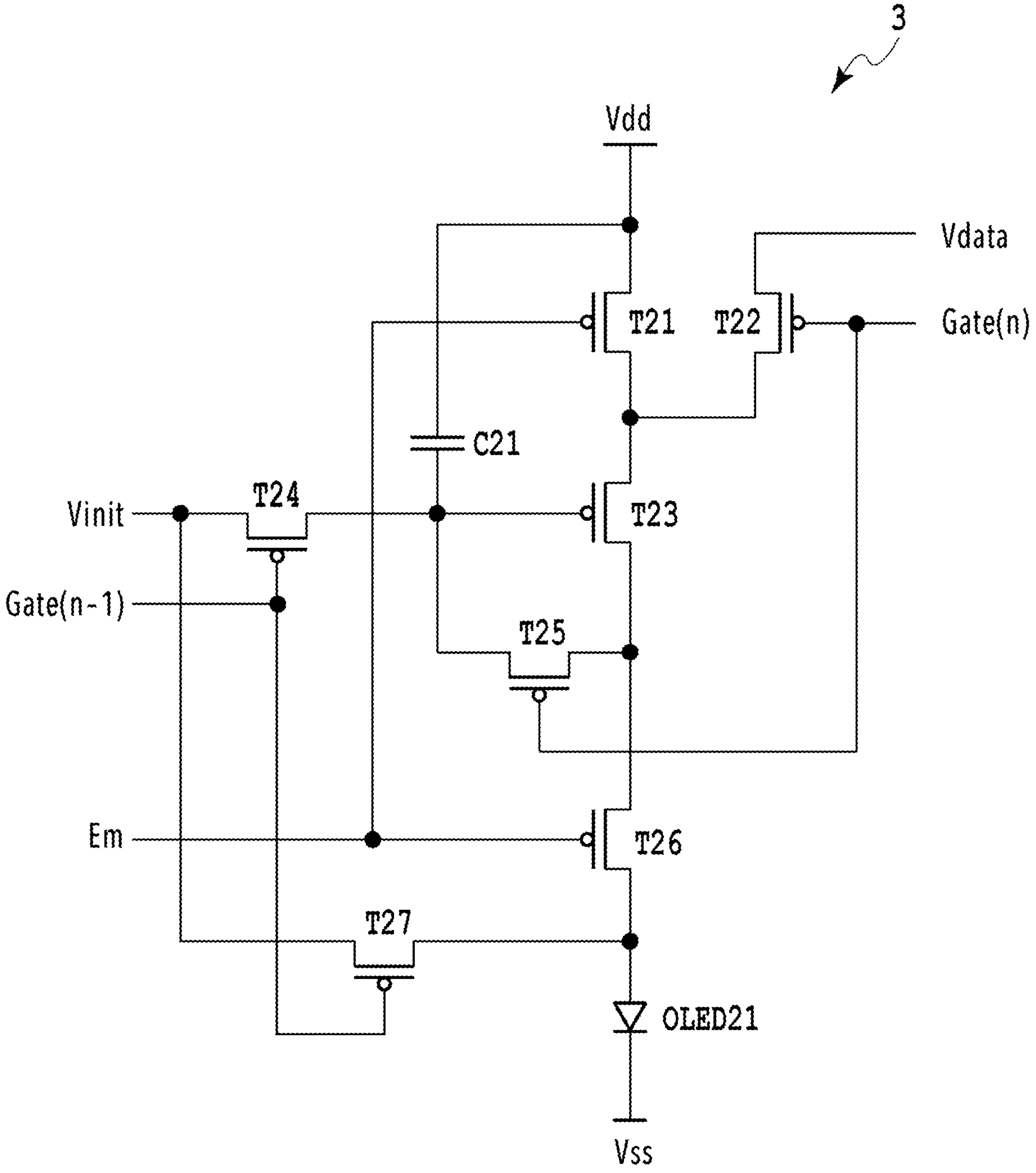
FIG. 3 is a diagram showing the configuration of a pixel unit drive circuit using the configuration of a 7T1C circuit.

FIG. 3 is a diagram showing the configuration of a pixel unit drive circuit using the configuration of a 7T1C circuit. The pixel unit drive circuit 3 includes a switching transistor T22 for, in response to a scan signal Gate(n) applied to the nth scan line, switching a data signal of a voltage level $V_{data}$ applied to the corresponding data line. The pixel unit drive circuit 3 also includes a driving transistor T23 that supplies a drive current for an organic EL element according to a charge voltage corresponding to a data signal input to the driving transistor T23 via the switching transistor T22, and a compensation transistor T25 for compensating for a threshold voltage of the driving transistor T23. The pixel unit drive circuit 3 further includes a capacitor C21 for storing the data signal of the level of a voltage applied to the gate of the driving transistor T23, and an organic EL element OLED 21 that emits light corresponding to the applied drive current.

Moreover, the pixel unit drive circuit 3 includes a switching transistor T21 for supplying a power supply voltage $V_{dd}$ to the driving transistor T23 in response to an emission signal Em, and a switching transistor T26 for supplying a drive current via the driving transistor T23 to the OLED 21 in response to the emission signal Em. The pixel unit drive circuit 3 also includes a reset transistor T24 for initializing a data signal stored in the capacitor C21 in response to a scan signal Gate(n−1) applied to the (n−1)th scan line immediately before the nth scan line. The pixel unit drive circuit 3 further includes a reset transistor T27 which has a source connected to an initialization voltage $V_{init}$, a gate connected to the scan signal Gate(n−1), and a drain connected to the OLED 21. The transistors T21 to T27 are configured as a p-type thin film transistor (TFT).

In the pixel unit drive circuits shown in FIGS. 1 and 3, a large number of transistors implemented for one pixel become a factor to complicate the circuit.

(APS)

Figure 4:
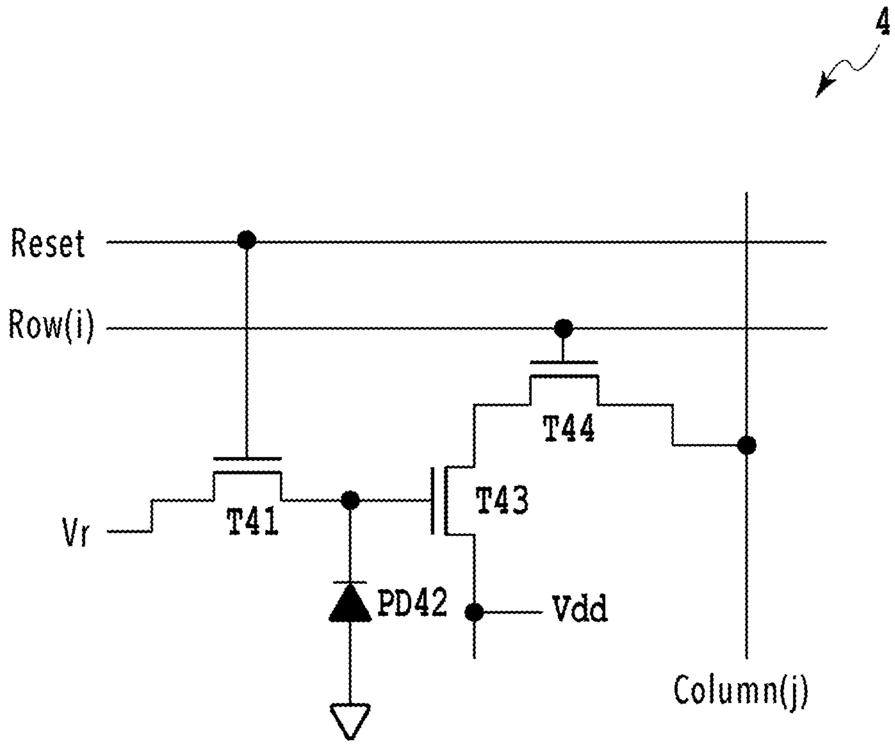
FIG. 4 is a diagram showing the structure of an APS having a photosensor.

FIG. 4 is a diagram showing the structure of an APS having a photosensor. The APS 4 includes, for each sub-pixel, three TFTs: a reset transistor T41 for resetting a voltage of a photodiode (PD) 42, an amplification transistor T43 for amplifying the gain of a signal from the PD 42, and a readout transistor T44 for reading a signal. The PD 42 forms a pn junction with a p-type semiconductor layer on the light reception side and an n-type semiconductor layer on the substrate side. When a reverse bias is applied to the pn junction, the pn junction becomes a depletion layer for the junction hardly has carriers. When light having energy greater than that of the band gap of the semiconductor is irradiated in the vicinity of the depletion layer, carriers are generated. The PD 42 may normally be configured as a PIN photodiode. The PIN photodiode includes three layers, namely $p^+$-Si (p-doped Silicon) layer, i-Si (intrinsic Silicon) layer and $n^+$-Si (n-doped Silicon) layer, and electrodes disposed with this layer structure in between. In the case of the PIN photodiode, the presence of the i layer widens the width of the depletion layer obtained when the reverse bias is applied, thus allowing the PIN photodiode to be used under a high reverse bias voltage. The high reverse bias voltage in the wide depletion layer quickly moves the carriers, thus improving the response speed.

In a reset period of the APS 4, the reset transistor T41 operates as a switch for resetting a floating fusion to Vr, in which case the floating fusion is expressed as a gate of the amplification transistor T43. The amplification transistor T43 has a capability of amplifying a signal by changing the current according to the voltage of the gate. In the example shown in FIG. 4, when the gate voltage becomes low, the current easily flows. When a reset signal Reset from a reset signal line turns the reset transistor T41 on, the PD 42 is connected to the power supply of the voltage Vr to charge initial charges. Then, in a read period, the reset transistor T41 is turned off, and a dark current is increased by irradiation of light on the PD 42, so that the stored initial charges are discharged. At this time, a potential on the cathode terminal of the PD 42 varies according to the light intensity, so that the amplification transistor T43 amplifies the signal flowing from a power supply of a power supply voltage $V_{dd}$ and supplies the signal to the jth column line Column(j). The readout transistor T44 allows a single row of the pixel array to be read by a reading electronic circuit.

When the pixel unit drive circuit using the 6T1C circuit shown in FIG. 1 or the 7T1C circuit shown in FIG. 3 and the APS having a photosensor shown in FIG. 4 are implemented together for a single subpixel of the organic EL display, therefore, the circuit configuration becomes complicated. This complication requires more footprint, thus lowering the resolution of the display.

(Dual Gate Transistor)

Figure 5:
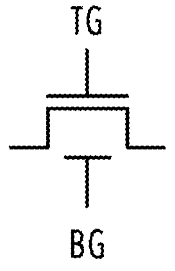
FIG. 5 is a diagram showing the configuration of an n-type dual gate transistor and a voltage vs. current characteristic.
Figure 5:
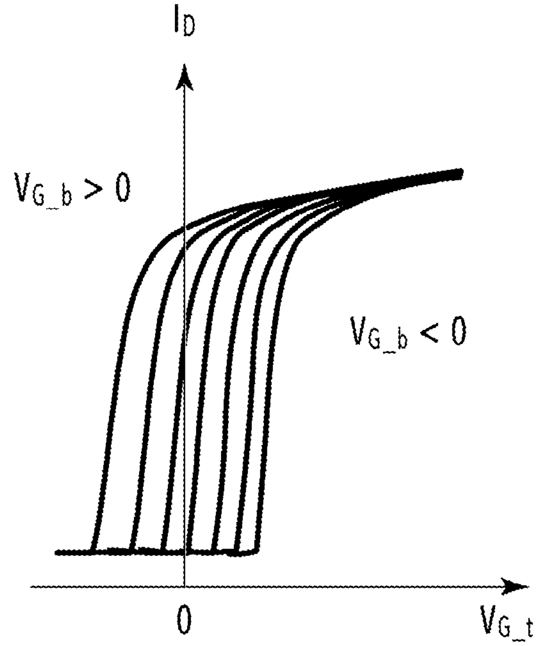

In the APS structure having a photosensor, a dual gate transistor can be used as an amplification transistor that amplifies the gain of a signal from a photodiode (PD). Ann-type dual gate transistor, as shown in FIG. 5A, has atop gate TG and a bottom gate BG. When the capacitance and the threshold voltage of the top gate TG respectively equal to those of the bottom gate BG, a drain current ID twice as large as that of a single-gate transistor may be allowed to flow. When the same drain current ID is needed, therefore, the dual gate transistor can have a lower gate voltage and can reduce consumption power as compared with a single-gate transistor.

With a gate voltage $V_{G\_t}$ applied to the top gate TG, as a gate voltage $V_{G\_b}$ of the bottom gate BG is increased in a negative direction, as shown in FIG. 5B, a $V_{G\_t}$-ID curve is shifted in a positive direction. As the gate voltage $V_{G\_b}$ is increased in the positive direction, on the other hand, the $V_{G\_t}$-ID curve is shifted in the negative direction. That is, with the gate voltage $V_{G\_t}$ applied, the drain current ID can be controlled by the gate voltage $V_{G\_b}$.

(3D-APS)

According to the present embodiment, the dual gate transistor is used in the combination of the pixel unit drive circuit and the APS structure to make the configuration simpler. The dual gate transistor is used both for transfer of the signal in the OLED and amplification of the PD signal. In the present embodiment, for example, a three-dimensional active pixel sensor (3D-APS) constituted by a dual gate transistor and a photodiode of the APS structure can be used.

Figure 6:
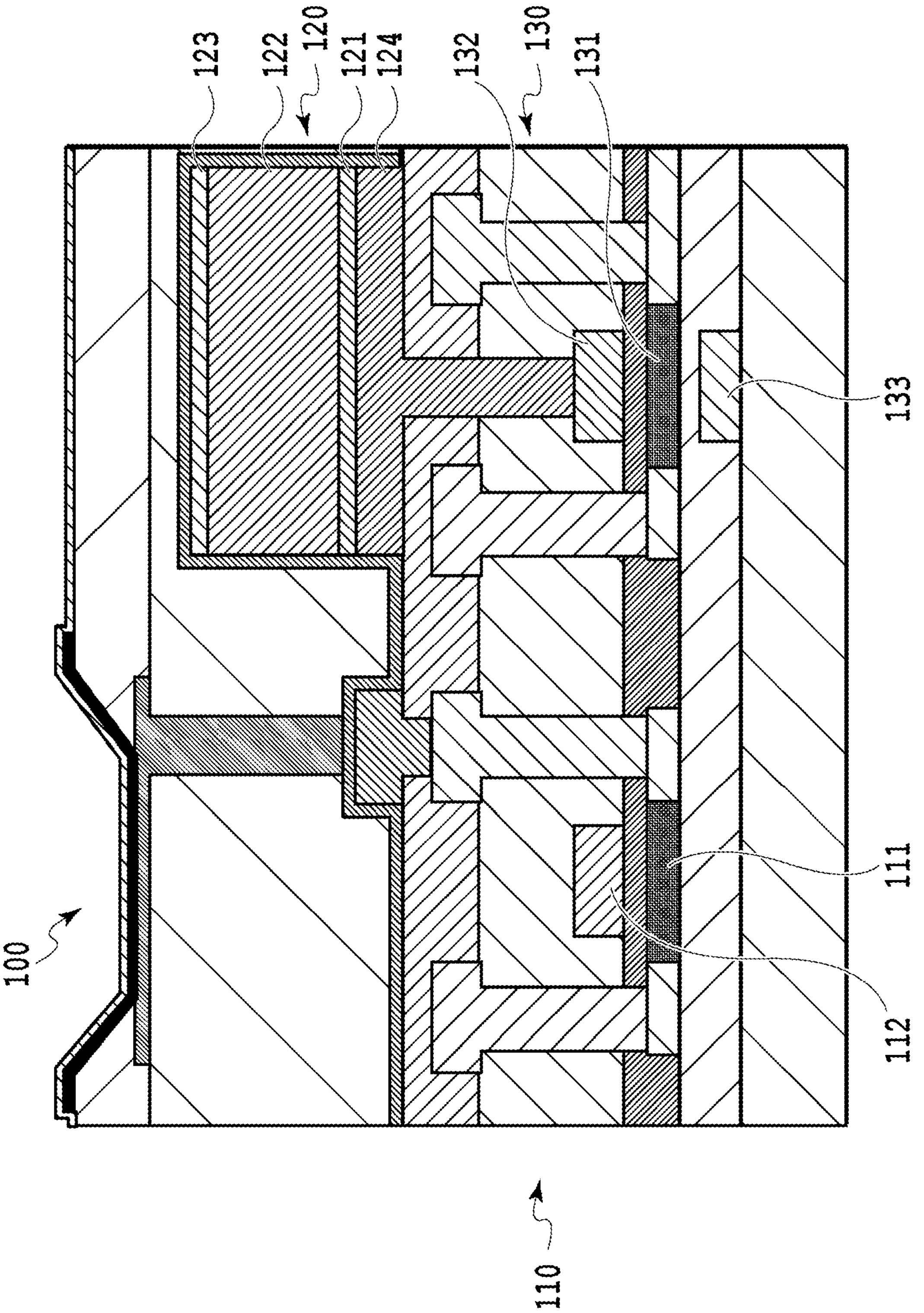
FIG. 6 is a diagram showing the configuration of a 3D-APS according to an embodiment of the present disclosure.

FIG. 6 shows the structure of a 3D-APS according to an embodiment of the present disclosure. FIG. 6 shows a case where one APS is combined for a single subpixel of an organic EL display. FIG. 6 shows an OLED 100, a driving transistor 110 for supplying a drive current for the OLED 100, a PIN photodiode (PD) 120 of the APS structure, and a dual gate transistor 130 for reading out a signal from the PD 120.

The dual gate transistor has a top gate 132 and a bottom gate 133 provided respectively on the top side and the bottom side of a channel formed by a poly-Si layer 131. The top gate 132 is connected to an anode electrode 124 of the PD 120. The PD 120 is a PIN-PD including a $p^+$-Si layer 121, i-Si layer 122, and $n^+$-Si layer 123. The driving transistor 110 is a single-gate transistor having only a top gate 112 on the top side of a channel formed by a poly-Si layer 111.

Disposing the PD 120 directly above the dual gate transistor 130 reduces the implementation area of the 3D-APS as well as improves the amplification factor provided by the dual gate transistor 130. Accordingly, when the APS is implemented in the pixel circuit of the organic EL display, the APS structure can serve as a photosensor which provides a desired sensitivity without decreasing the implementation efficiency of the pixel circuit.

(7T1C+APS)

Figure 7:
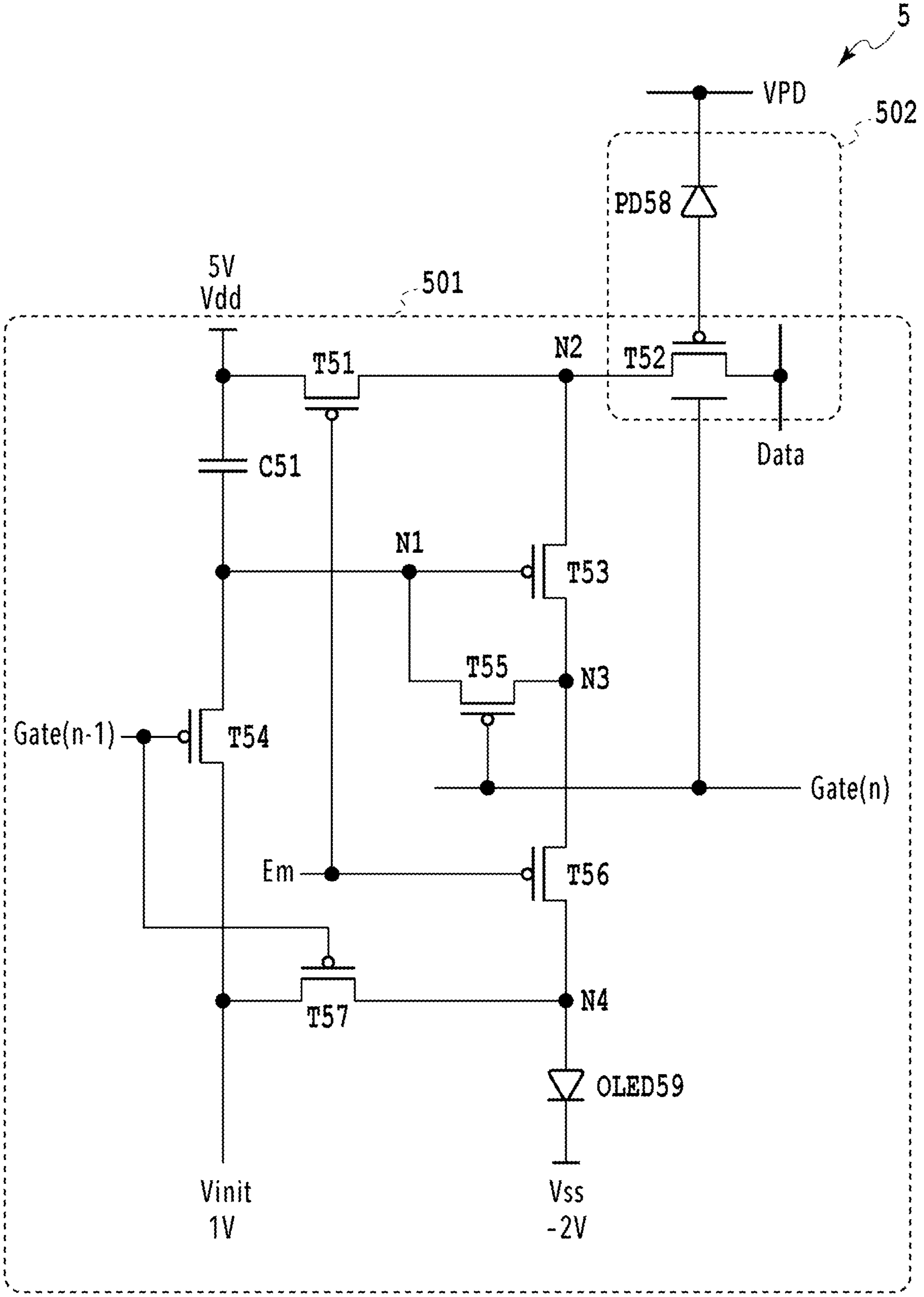
FIG. 7 is a diagram showing the configuration of a pixel unit drive circuit according to an embodiment of the present disclosure.

FIG. 7 is a diagram showing the configuration of a pixel circuit 5 including a combination of a pixel unit drive circuit 501 and a photosensor 502 according to the present embodiment. The pixel unit drive circuit 501 uses a 7T1C circuit shown in FIG. 3, and compensates for the threshold voltage $V_{th}$ of the driving transistor.

The pixel unit drive circuit 501 includes a switching transistor T52 for, in response to a scan (gate) signal Gate(n) applied to an nth scan line, switching a data signal of a voltage level $V_{data}$ applied to the corresponding data line. The pixel unit drive circuit 501 also includes a driving transistor T53 that supplies a drive current for an OLED 59 according to a charge voltage corresponding to a data signal input to the driving transistor T53 via the switching transistor T52, and a compensation transistor T55 for compensating for a threshold voltage of the driving transistor T53. The pixel unit drive circuit 501 further includes a capacitor C51 for storing the data signal applied to the gate of the driving transistor T53, and the OLED 59 that emits light corresponding to the applied drive current.

Moreover, the pixel unit drive circuit 501 includes a switching transistor T51 for supplying a power supply voltage $V_{dd}$ of 5V to the driving transistor T53 in response to an emission signal Em, and a switching transistor T56 for supplying a drive current supplied from the driving transistor T53 to the OLED 59 in response to the emission signal Em. The pixel unit drive circuit 501 also includes reset transistors T54 and T57 for initializing a data signal stored in the capacitor C51 in response to a scan signal Gate(n−1) applied to an (n−1)th scan line immediately before the nth scan line. The transistors T51 to T57 are configured as a p-type thin film transistor (TFT).

The switching transistor T52 is a dual gate transistor having a top gate (first gate) connected to an anode terminal of a PD 58, and a bottom gate (second gate) connected to the pixel unit drive circuit 501 via the corresponding second scan line. The switching transistor T52, in the pixel unit drive circuit 501, has a source to which a data signal of a voltage level $V_{data}$ applied to the corresponding data line is applied, and a drain connected to a source of the driving transistor T53. In addition, as will be described later, the switching transistor T52 which is a dual gate transistor also operates as a readout transistor which reads out a signal from the PD 58 and an amplification transistor which amplifies a signal.

The driving transistor T53 has a gate connected to one terminal of the capacitor C51, and a drain connected to an anode terminal of the OLED 59 via the switching transistor T56. The compensation transistor T55 has a drain connected to the gate of the driving transistor T53, a source connected to the drain of the driving transistor T53, and a gate to which the scan signal Gate(n) is applied. The power supply voltage $V_{dd}$ of 5V is supplied from the corresponding power supply to the other terminal of the capacitor C51.

The switching transistor T51 has a gate to which the emission signal Em is applied, a source to which the power supply voltage $V_{dd}$ is applied through the corresponding power supply voltage line, and a drain connected to the source of the driving transistor T53. The switching transistor T56 has a gate to which the emission signal Em is applied, a source connected to the drain of the driving transistor T53, and a drain connected to the anode terminal of the EL element OLED 59. A cathode terminal of the EL element OLED 59 is connected to a power supply of a voltage $V_{ss}$ of −2V.

The reset transistor T54 has a gate to which the scan signal Gate(n−1) is applied, a source connected to one terminal of the capacitor C51, and a drain to which an initialization voltage $V_{init}$ is applied. The reset transistor T57 has a source connected to a power supply whose initialization voltage $V_{init}$ is 1 V, a gate connected to the scan signal Gate(n−1), and a drain connected to the anode terminal of the OLED 59.

Figure 8:
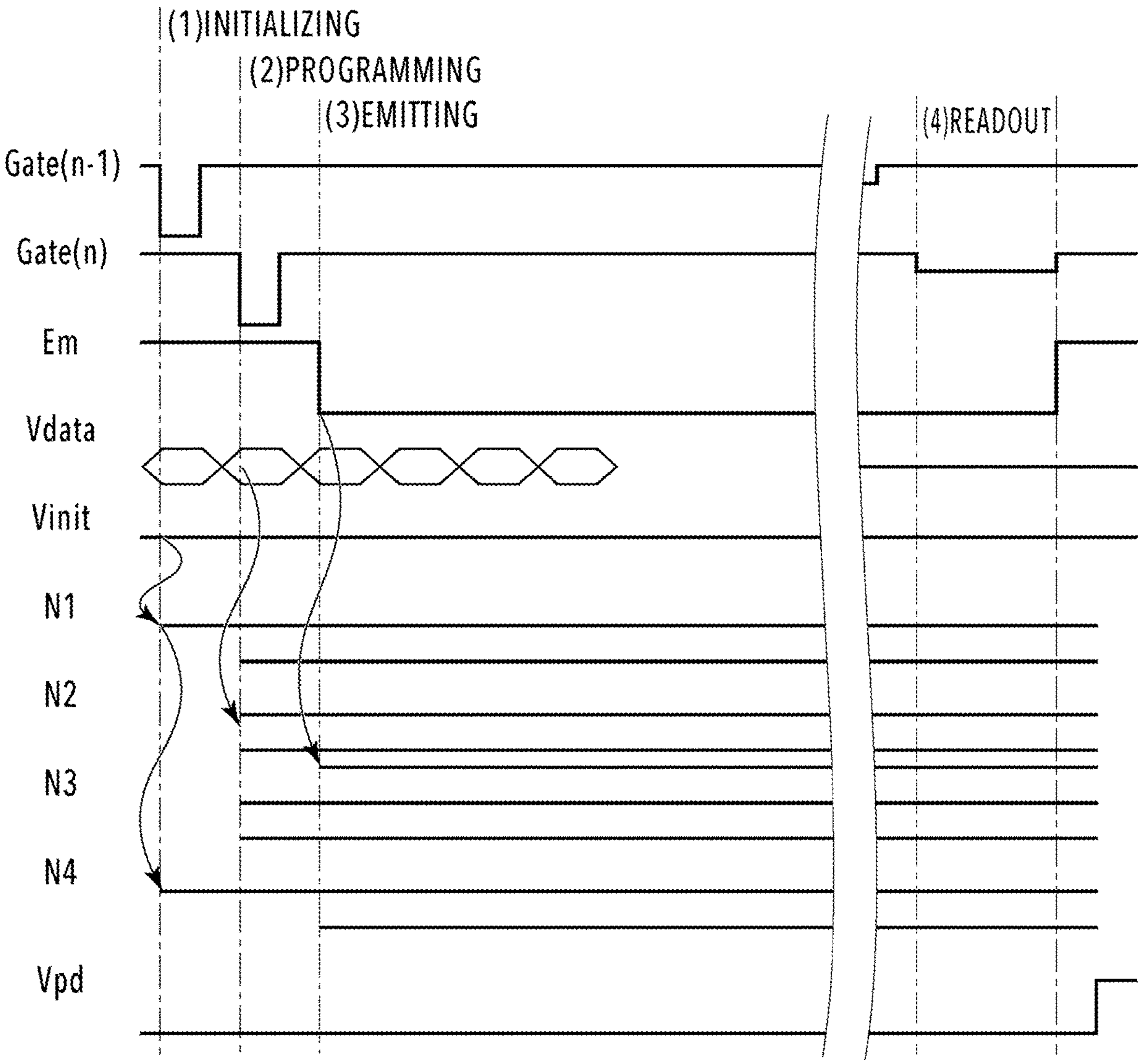
FIG. 8 is a timing chart in the operation of the pixel unit drive circuit.

Next, procedures of a pixel control method that is executed by the pixel circuit 5 shown in FIG. 7 will be described with reference to a timing chart in FIG. 8 and FIG. 9 showing voltages at the individual nodes. According to the present embodiment, the control period includes an initialization period in which the pixel unit drive circuit 501 initializes the pixel unit, a write period in which a voltage for driving the pixel unit is precharged, an emission period for the OLED 59, and a read period for reading the PD 58.

Figure 10:
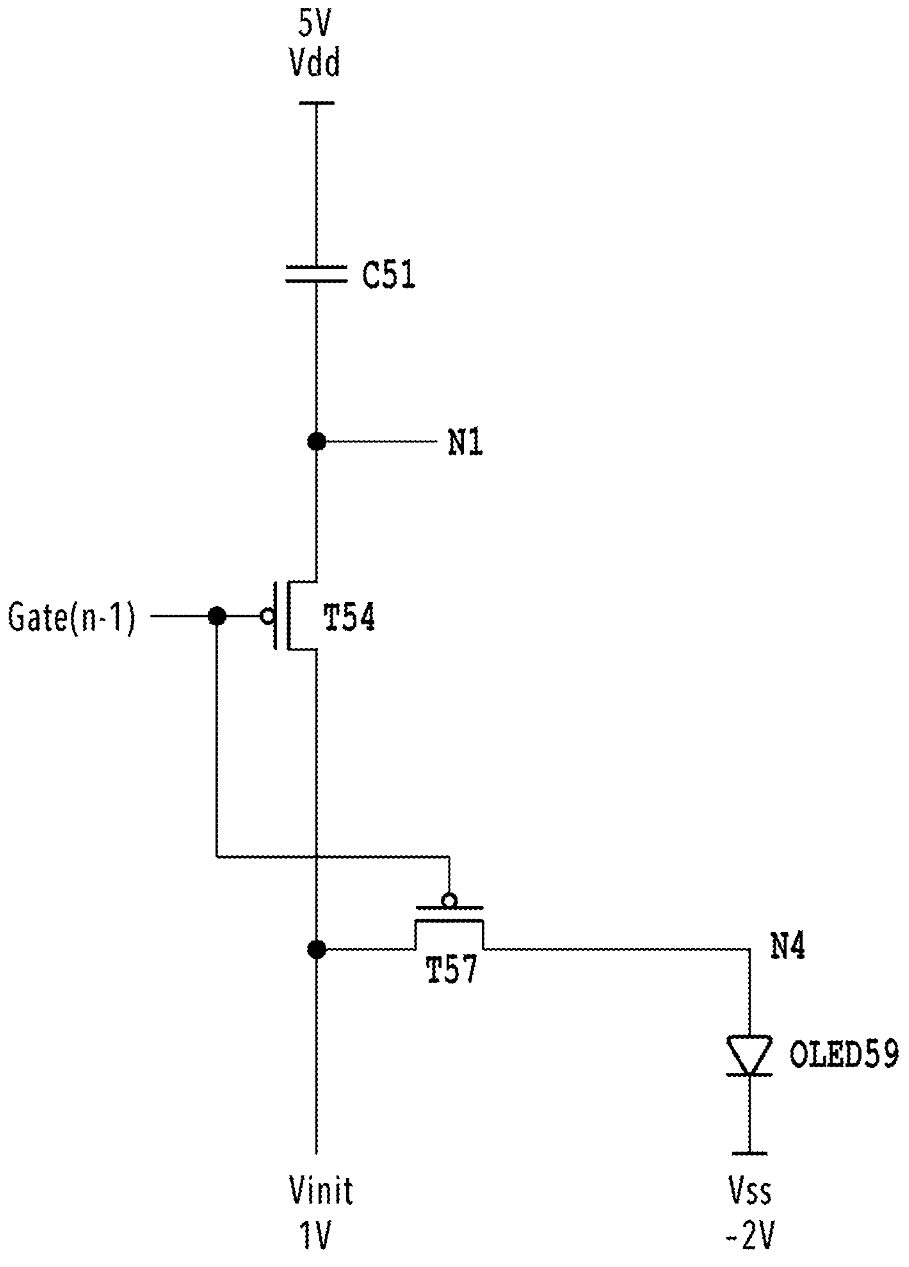
FIG. 10 is an equivalent circuit diagram in an OLED initialization period of the pixel unit drive circuit.

In an initialization period (Initializing), the scan signal Gate(n−1) is at a low level, and the scan signal Gate(n) and the emission signal Em are at a high level. In addition, the bias voltage VPD at the cathode terminal of the PD 58 is at a high level, and a potential at the anode terminal thereof is close to a low level. The low-level scan signal Gate(n−1) turns the reset transistors T54 and T57 on, and the high-level scan signal Gate(n) and emission signal Em turn the other transistors T51 to T53, T55, and T56 off. Therefore, the pixel unit drive circuit 501 takes a circuit configuration as shown in FIG. 10, so that the data signal stored in the capacitor C51 is initialized, thus causing the initialization voltage $V_{init}$ to be applied to the gate of the driving transistor T53 (Node N1). Consequently, the reset transistor T57 is turned on, so that the initialization voltage $V_{init}$ is also applied to the anode terminal of the OLED 59 (Node N4).

Figure 11:
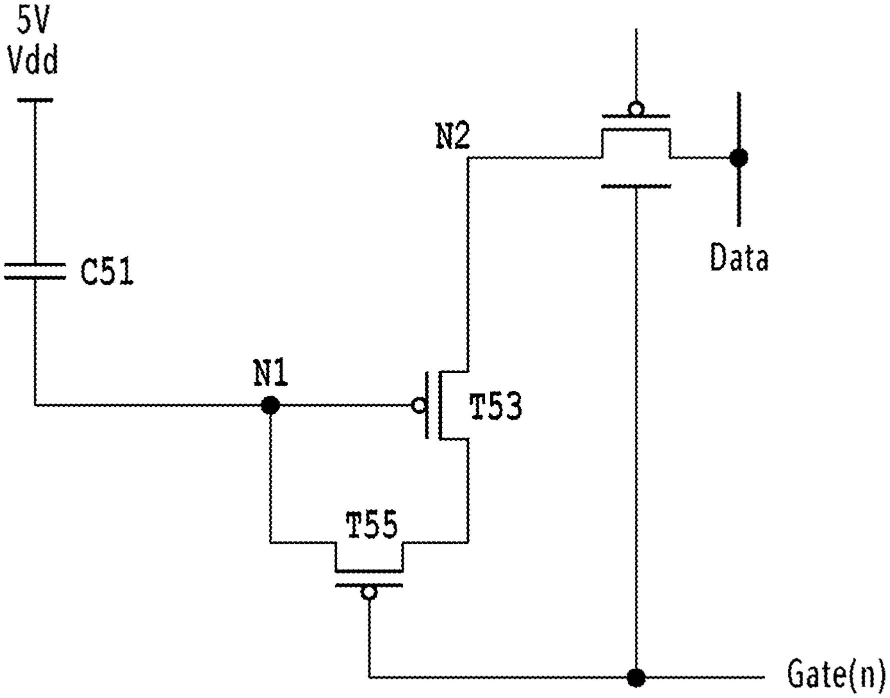
FIG. 11 is an equivalent circuit diagram in an OLED write period of the pixel unit drive circuit.

Next, in the OLED write period (Programming), the scan signal Gate(n−1) is at a high level, the scan signal Gate(n) is at a low level, and the emission signal Em is at a high level. Further, the potential at the anode terminal of the PD 58 is at a low level. Therefore, the reset transistors T54 and T57 are turned off, the switching transistors T51 and T56 are turned off, and the compensation transistor T55 and the driving transistor T53 are turned on. The scan signal Gate(n) also turns the switching transistor T52 on, and the emission signal Em turns the switching transistors T51 and T56 off, so that the pixel unit drive circuit 501 takes a circuit configuration as shown in FIG. 11. Consequently, the data signal of the voltage level $V_{data}$ to be applied to the corresponding data line is applied to the source of the driving transistor T53 (Node N2), the voltage of the gate of the driving transistor T53 (Node N1) is stabilized to be $V_{data}$-$V_{th}$, where $V_{th}$ is the threshold voltage of the driving transistor T53. Then, electric charges corresponding to the gate voltage $V_{data}$-$V_{th}$ are stored in the capacitor C51, which completes the precharge operation.

Figure 12:
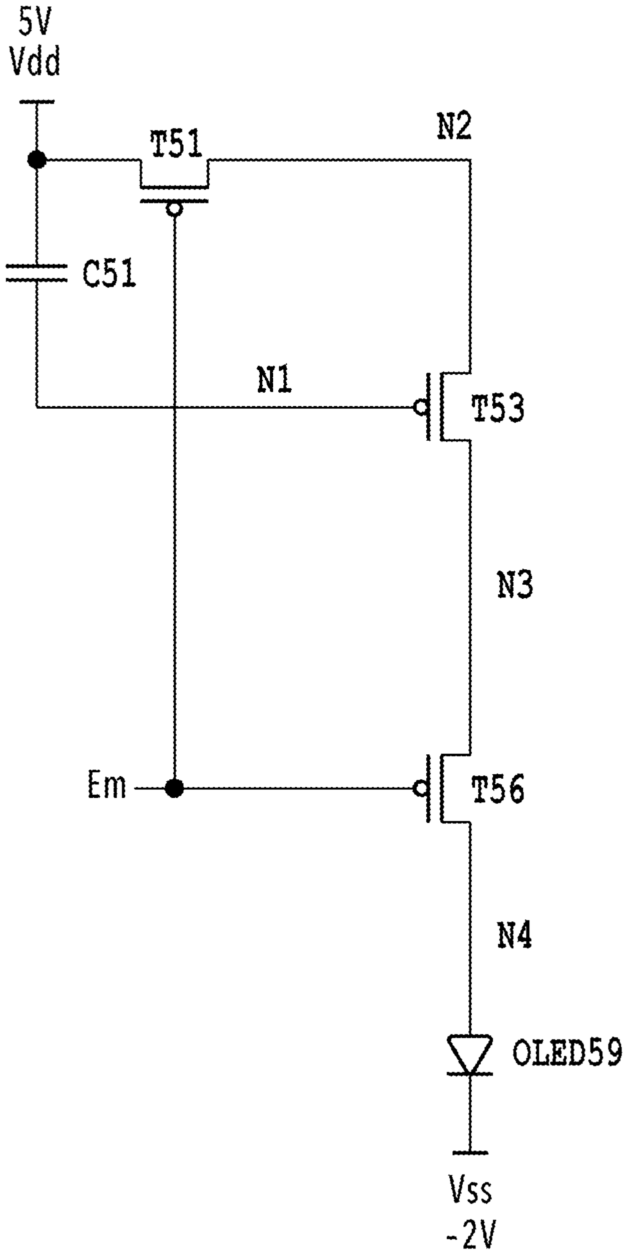
FIG. 12 is an equivalent circuit diagram in an OLED emission period of the pixel unit drive circuit.

Next, in the emission period (Emitting), the scan signal Gate(n) is at a high level, and the emission signal Em goes low after the scan signal Gate(n−1) goes high. The potential at the anode terminal of the PD 58 goes low. As a result, the low-level emission signal Em turns the switching transistors T51 and T56 on, the high-level scan signal Gate(n−1) turns the reset transistors T54 and T57 off, and the high-level scan signal Gate(n) turns the compensation transistor T55 and the switching transistor T52 off, so that the pixel unit drive circuit 501 has a circuit configuration formed as shown in FIG. 12. Consequently, the drive current which is generated according to the charge voltage ($V_{data}$-$V_{th}$) corresponding to the data signal input to the gate of the driving transistor T53 is supplied via the transistor T53 to the OLED 59, thus causing the OLED 59 to emit light. That is, the current that does not depend on the threshold voltage of the TFT flows through the OLED 59, so that the OLED 59 emits light.

Figure 13:
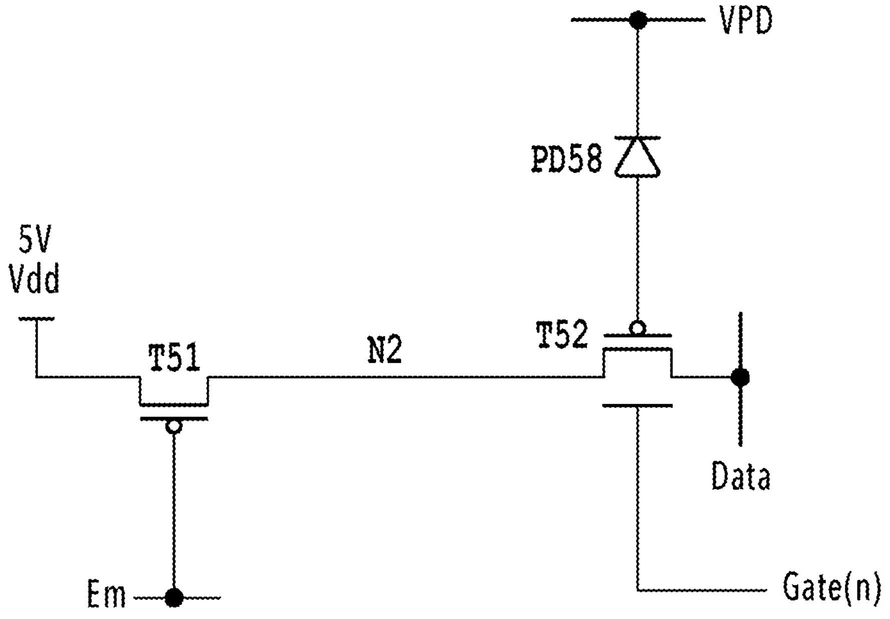
FIG. 13 is an equivalent circuit diagram in a PD read period of the pixel unit drive circuit.

Finally, reading of the PD 58 (PD reading) is performed. In the PD read period (Readout), the scan signal Gate(n−1) is at a high level. Meantime, the pulse level of the scan signal Gate(n) to be supplied to the bottom gate (second gate) of the switching transistor T52 is adaptively controlled to be a middle level (hereinafter, referred to as "intermediate level $V_{bias}$") between the low level and the high level. In addition, the emission signal Em is at a low level, and the potential at the anode terminal of the PD 58 is almost at a high level. The reset transistors T54 and T57 are turned off, and the switching transistors T51 and T56 are turned on by the emission signal Em. Therefore, the pixel unit drive circuit 501 takes a circuit configuration as shown in FIG. 13, so that a voltage corresponding to the stored initial charges by irradiation of light onto the PD 58 is applied to the top gate. Because an intermediate voltage is applied to the switching transistor T52 by the scan signal Gate(n) at this time, a current according to the voltage at the top gate is supplied to the data line Data from the power supply of the power supply voltage $V_{dd}$.

According to the present embodiment, as described above, in the combination of the OLED and the APS, resetting and reading of the PD can be performed quickly.

(Reading PD)

Figure 14:
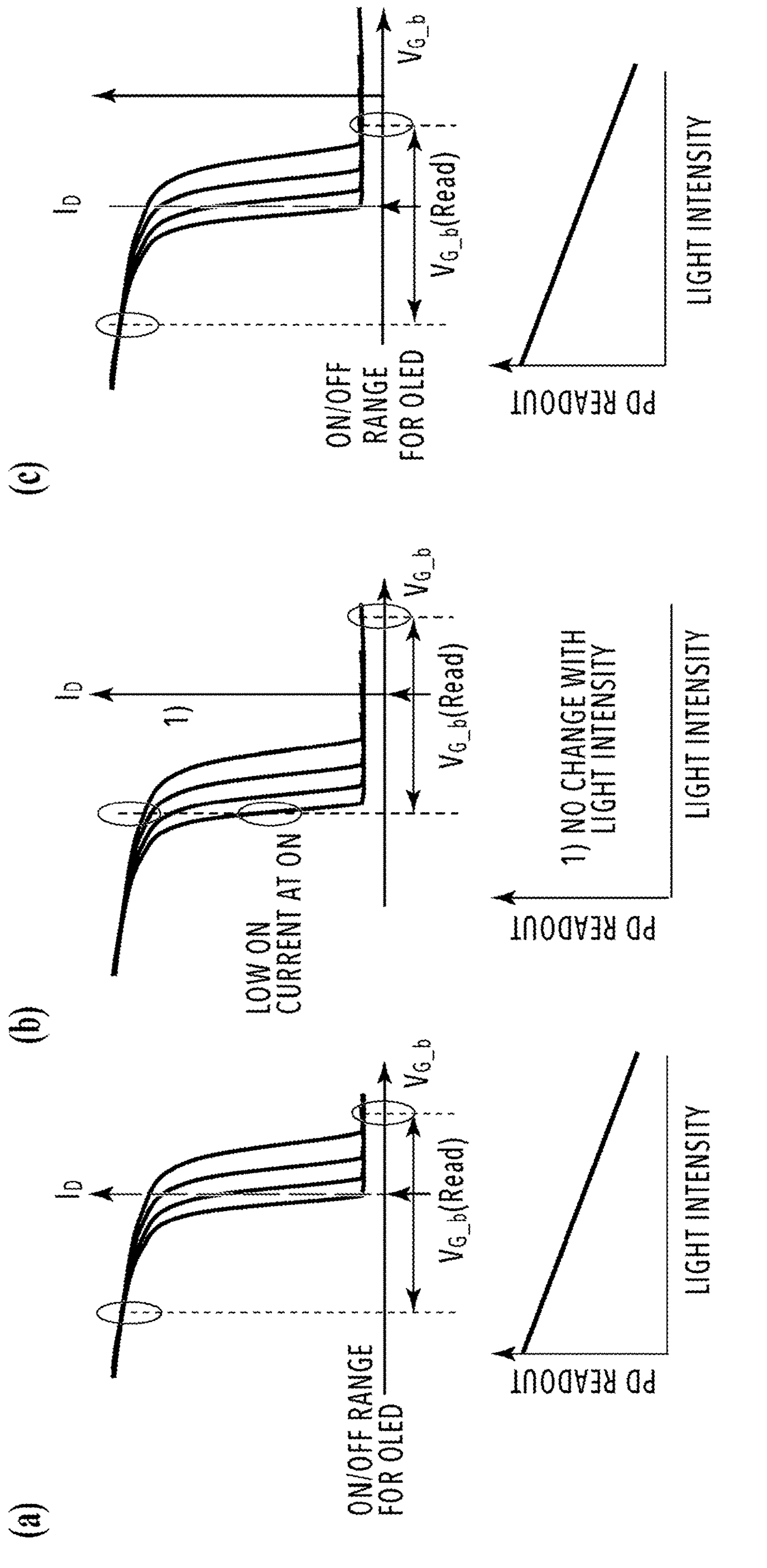
FIG. 14 is a diagram for describing a control method in a PD read period of an APS.

According to the present embodiment, as described above, a three-dimensional active pixel sensor (3D-APS) is used. With reference to FIG. 14, a control method in the PD read period (Readout) of the 3D-APS will be described. A photosensor is affected by ambient environmental light, which raises the following problem in the case of a highly sensitive photosensor like a 3D-APS.

A predetermined gate voltage $V_{G\_t}$ is applied to the top gate TG of the transistor T52, which is a dual gate transistor, via the PD 58. The gate voltage $V_{G\_t}$ of the top gate TG varies according to the amount of light received at the PD 58. At this time, as shown in FIG. 14A, the drain current ID becomes maximum when the OLED is ON (when the amount of light received at the PD 58 is large), the drain current ID becomes minimum when the OLED is OFF (when the amount of light received at the PD 58 is small), and the gate voltage $V_{G\_b}$ ($V_{bias}$) of the bottom gate BG is set to a level such that the drain current ID changes between the point of the maximum drain current ID and the point of the minimum drain current ID according to the amount of light received at the PD 58.

In a case where the intensity of ambient environmental light is strong as in outdoor in fine weather, however, when the gate voltage $V_{G\_t}$ of the top gate TG becomes high, the aforementioned setting of the gate voltage $V_{G\_b}$ of the bottom gate BG prevents the PD 58 from detecting light other than the environmental light (see FIG. 14B).

In consideration of this problem, according to the present embodiment, as shown in FIG. 14C, the gate voltage $V_{G\_b}$ of the bottom gate BG is adaptively changed according to the intensity of ambient environmental light. Specifically, the gate voltage $V_{G\_b}$ ($V_{bias}$) is set according to a signal from a photosensor which is implemented separately from the pixel circuit to monitor environmental light. In this manner, the photosensor is not affected by ambient environmental light and can operate as a highly sensitive photosensor.

Although the description of the present embodiment has been given of 7T1C+APS by way of example, the pixel circuit may use 6T1C+APS, or other pixel unit drive circuits may use a dual gate transistor for a switching transistor for switching a data signal applied to a data line, so that the dual gate transistor operates as a readout transistor for reading out a signal from the photosensor as well as an amplification transistor for amplifying a signal.

Another Embodiment

Figure 15:
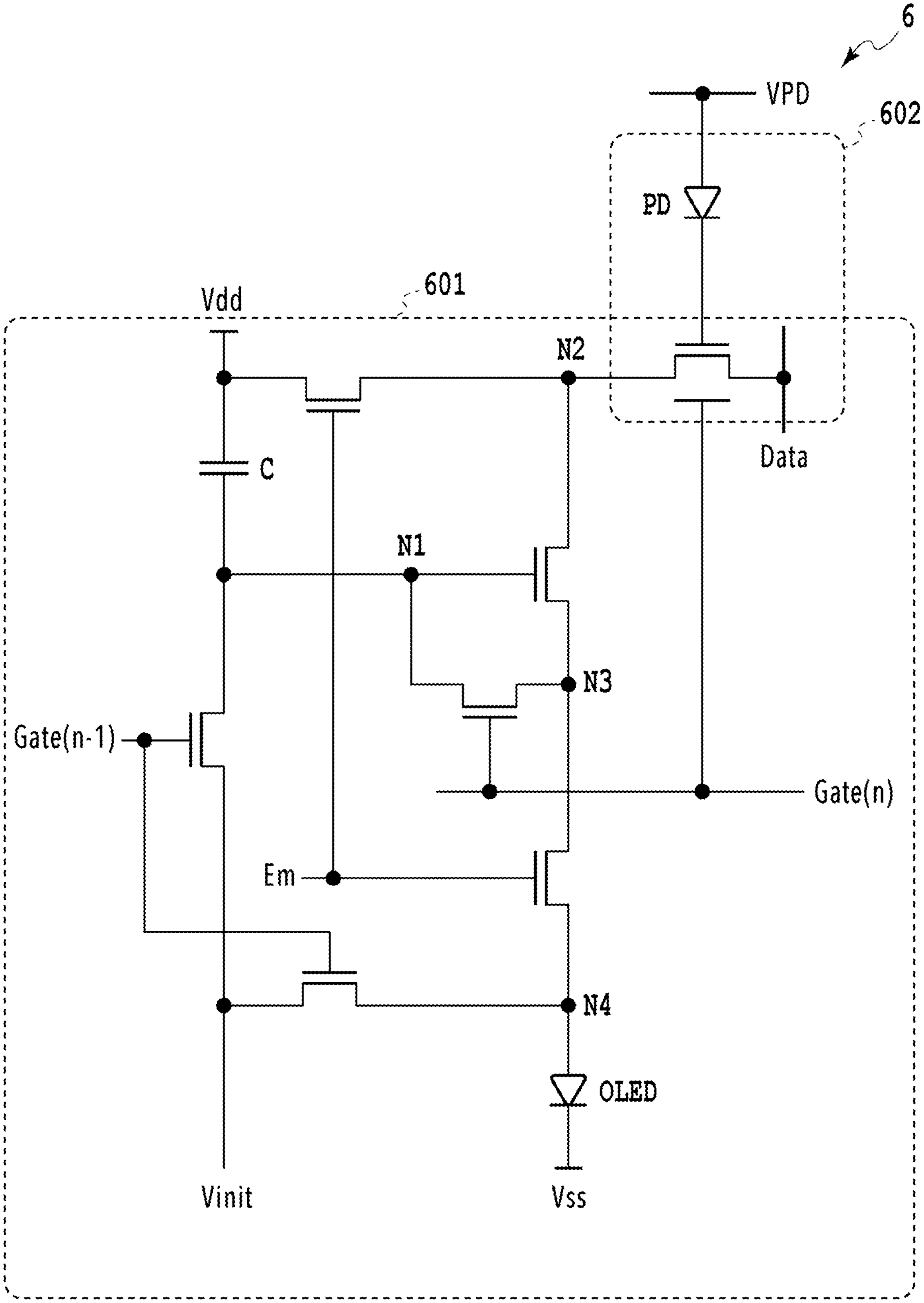
FIG. 15 is a diagram showing the configuration of a pixel unit drive circuit according to an embodiment of the present disclosure.

FIG. 15 shows the configuration of a pixel unit drive circuit according to another embodiment. According to the above embodiment, a 7T1C circuit as a pixel circuit is configured with p-type thin film transistors (TFTs). The pixel circuit 6 including a combination of a pixel unit drive circuit 601 and a photosensor 602 may be configured with n-type TFTs. As shown in FIG. 15, electrodes of transistors in the pixel unit drive circuit 601 and the photosenser 602 is opposite to that of the 7T1C circuit as shown in FIG. 7.

(Shutter Function)

Figure 16:
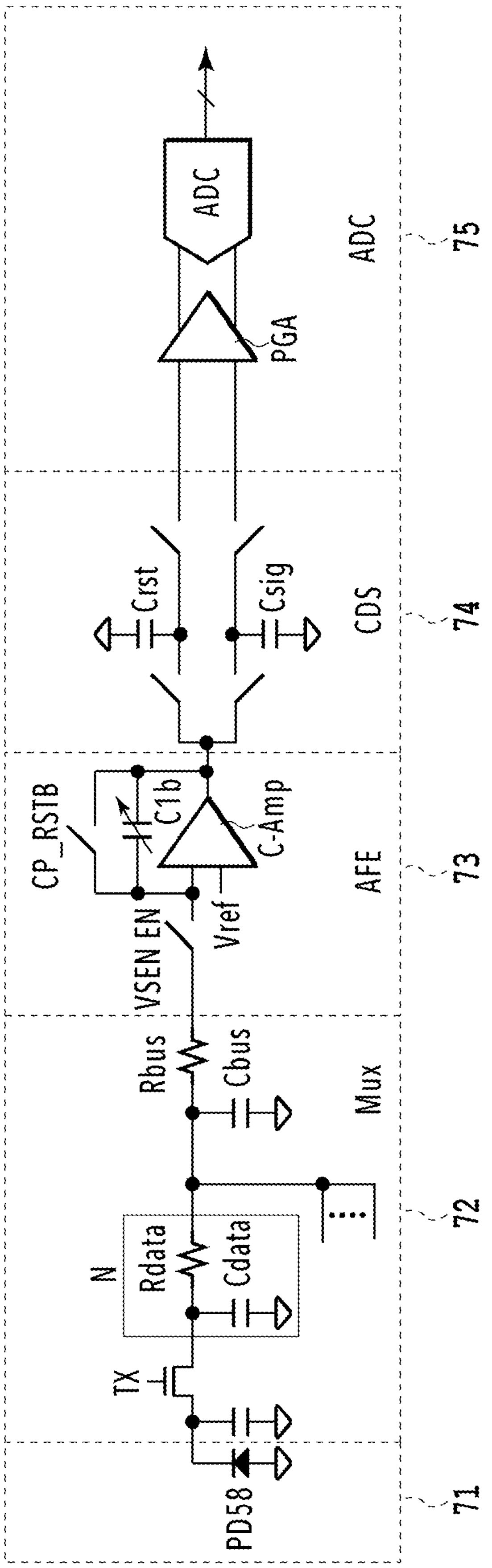
FIG. 16 is a diagram showing the configuration of a PD reading circuit according to an embodiment of the present disclosure.

Further, a description will be given of a shutter function in a post-processing circuit which processes signal read out from the PD 58 to overcome the problem caused by environmental light. FIG. 16 shows the configuration of a PD reading circuit according to an embodiment of the present disclosure.

A signal ($V_{data}$) read out from a PD 58 in a pixel circuit 71 is smoothed in a multiplexer (Mux) 72 implemented in the panel of an organic EL display, is then amplified by a front-end amplifier (AFE) 73, and is then input to a sampling circuit (CDS) 74. The CDS 74 compares the input signal with a reference signal at a time of no input light to convert the level of the measured signal. The signal converted by the CDS 74 is converted by an analog-digital converter (ADC) 75 to a digital signal, which is in turn output.

According to a first example of the shutter function, the sampling rate in the CDS 74 is changed to lower the signal level by the light intensity according to environmental light. That is, as the intensity of environmental light becomes stronger, on-time of a switch in the CDS 74 is made shorter to narrow the pulse width and the sampling period is made shorter, thereby lowering the signal level.

According to a second example of the shutter function, the sampling period or the coupling capacitance ($C_{1b}$) in the AFE 73 is changed according to the intensity of environmental light. That is, as in the case of the CDS 74, as the intensity of environmental light becomes stronger, on-time of a switch VSEN EN is made shorter to narrow the pulse width and the sampling period is made shorter, thereby lowering the signal level. By changing a capacitance value of the coupling capacitance ($C_{1b}$), an amplitude gain is made lower, thereby lowering the signal level.

Figure 17:
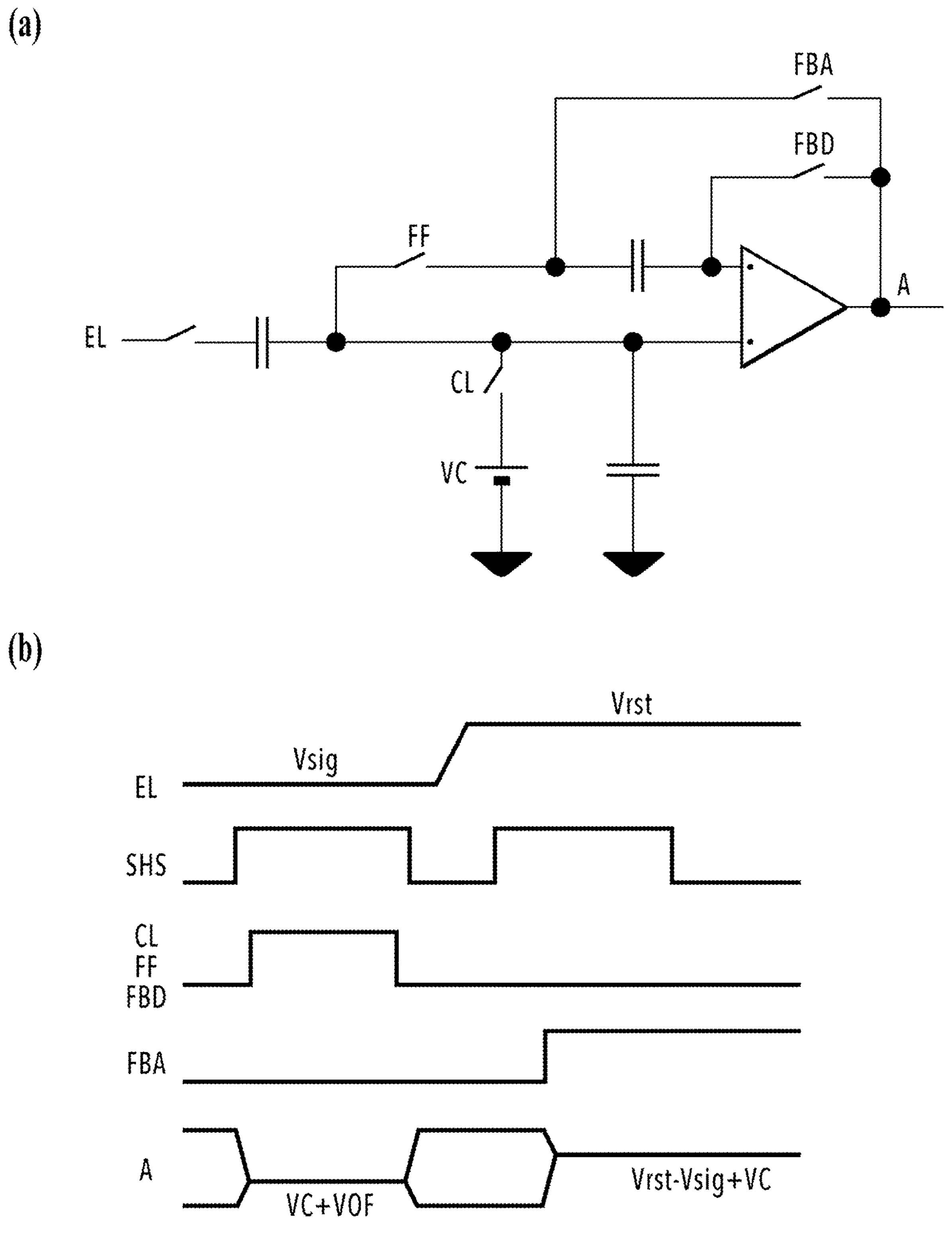
FIG. 17 is a diagram showing the configuration of a column amplifier circuit of the PD reading circuit.

According to a third example of the shutter function, a column amplifier circuit is used for each data line in the Mux 72, and the sampling period of the column amplifier or the coupling capacitance is changed according to the intensity of environmental light. FIG. 17 shows an example of a column amplifier circuit in the PD reading circuit. When switches CL, FF and FBD go on, a node A becomes a voltage of an offset voltage VOF of the column amplifier circuit in addition to a voltage VC of a power supply. While a switch SHS goes off, a readout voltage $V_{sig}$ of a signal EL is changed to a reset voltage $V_{rst}$. Again the switch SHS goes on and the switch FBA goes on, the output of the node A only depends on the reset voltage $V_{rst}$, the readout voltage $V_{sig}$ and the voltage VC of the power supply, and then the offset voltage VOF is canceled. According to this column amplifier circuit, saturation of the signal EL can be prevented.

The foregoing descriptions are merely exemplary implementation manners of the present disclosure, but are not intended to limit the protection scope of the present disclosure. Any variation or replacement readily figured out by a person skilled in the art within the technical scope disclosed may fall within the protection scope of the present disclosure.

What is claimed is:

1. A pixel circuit comprising:

a switching transistor configured to switch a data signal to be applied to a data line;

a driving transistor configured to supply a drive current to an organic light emitting diode (OLED) according to a charge voltage corresponding to the data signal;

a compensation transistor configured to compensate for a threshold voltage of the driving transistor; and a photosensor having a terminal to which a bias voltage is applied;

wherein the switching transistor is a dual gate transistor having a first gate connected to another terminal of the photosensor, and a second gate connected to a gate of the compensation transistor;

wherein the pixel circuit is configured, based on a scan signal applied to the second gate of the switching transistor being at a high level, to cause the OLED to emit light during an emission operation of the pixel circuit, wherein the scan signal being at the high level turns both the compensation transistor and the switching transistor off; and wherein the pixel circuit is configured, based on the scan signal applied to the second gate of the switching transistor being at an intermediate level between a low level and the high level, to perform a readout operation with respect to the photosensor, wherein during the readout operation, a current is supplied to the data line from a power supply according to the voltage at the first gate of the switching transistor, wherein the voltage at the first gate of the switching transistor corresponds to irradiation of light onto the photosensor.

2. The pixel circuit according to claim 1, wherein, with respect to performing the readout operation, the scan signal applied to the second gate is an adaptively controlled scan signal.

3. The pixel circuit according to claim 2, wherein the adaptively controlled scan signal is controlled according to an intensity of environmental light.

4. A display device comprising:

a plurality of pixel units; and a cover plate;

wherein the plurality of pixel units are all located on the same side of the cover plate, wherein each pixel unit includes a pixel circuit, wherein the pixel circuit comprises:

a switching transistor configured to switch a data signal to be applied to a data line;

a driving transistor configured to supply a drive current to an organic light emitting diode (OLED) according to a charge voltage corresponding to the data signal;

a compensation transistor configured to compensate for a threshold voltage of the driving transistor; and a photosensor having a terminal to which a bias voltage is applied;

wherein the switching transistor is a dual gate transistor having a first gate connected to another terminal of the photosensor, and a second gate connected to a gate of the compensation transistor;

wherein the pixel circuit is configured, based on a scan signal applied to the second gate of the switching transistor being at a high level, to cause the OLED to emit light during an emission operation of the pixel circuit, wherein the scan signal being at the high level turns both the compensation transistor and the switching transistor off; and wherein the pixel circuit is configured, based on the scan signal applied to the second gate of the switching transistor being at an intermediate level between a low level and the high level, to perform a readout operation with respect to the photosensor, wherein during the readout operation, a current is supplied to the data line from a power supply according to the voltage at the first gate of the switching transistor, wherein the voltage at the first gate of the switching transistor corresponds to irradiation of light onto the photosensor.

5. The display device according to claim 4, further comprising:

a shutter function for performing level conversion on a signal from the photosensor read out from the data line.

6. A pixel control method for a pixel circuit, comprising:

operating a dual-gate switching transistor as a switch for switching a data signal to be applied to a data line, wherein the dual-gate switching transistor has a first gate connected to a terminal of a photosensor and a second gate connected to a gate of a compensation transistor;

supplying, by a driving transistor, a drive current to an organic light emitting diode (OLED) according to a charge voltage corresponding to the data signal to cause the OLED to emit light, wherein causing the OLED to emit light is based on scan signal applied to the second gate of the switching transistor being at a high level, wherein the scan signal being at the high level turns both the compensation transistor and the switching transistor off;

compensating, by the compensation transistor, for a threshold voltage of the driving transistor;

applying a bias voltage to another terminal of the photosensor; and performing a readout operation with respect to the photosensor based on the scan signal applied to the second gate of the switching transistor being at an intermediate level between a low level and the high level, wherein during the readout operation, a current is supplied to the data line from a power supply according to the voltage at the first gate of the switching transistor, wherein the voltage at the first gate of the switching transistor corresponds to irradiation of light onto the photosensor.

7. The method according to claim 6, wherein the scan signal is a scan signal adaptively controlled according to an intensity of environmental light.

* * * * *